United States Patent
Kobayashi

(10) Patent No.: US 10,996,513 B2
(45) Date of Patent: May 4, 2021

(54) LIGHTING DEVICE AND DISPLAY DEVICE

(71) Applicant: Funai Electric Co., Ltd., Osaka (JP)

(72) Inventor: Tomohiro Kobayashi, Osaka (JP)

(73) Assignee: FUNAI ELECTRIC CO., LTD., Osaka (JP)

( * ) Notice: Subject to any disclaimer, the term of this patent is extended or adjusted under 35 U.S.C. 154(b) by 0 days.

(21) Appl. No.: 16/929,667

(22) Filed: Jul. 15, 2020

(65) Prior Publication Data
US 2021/0018798 A1   Jan. 21, 2021

(30) Foreign Application Priority Data
Jul. 19, 2019   (JP) ............................ JP2019-134023

(51) Int. Cl.
*G02F 1/13357* (2006.01)
(52) U.S. Cl.
CPC .. *G02F 1/133608* (2013.01); *G02F 1/133605* (2013.01); *G02F 1/133606* (2013.01); *G02F 1/133603* (2013.01)
(58) Field of Classification Search
CPC ......... G02F 1/133608; G02F 1/133605; G02F 1/133606; G02F 1/133603
See application file for complete search history.

(56) References Cited

U.S. PATENT DOCUMENTS

2019/0271884 A1* 9/2019 Watanabe ......... G02F 1/133611

FOREIGN PATENT DOCUMENTS

| JP | WO-2011108603 A1 * | 9/2011 | ........... G02B 5/0226 |
|---|---|---|---|
| WO | 2011/108603 A1 | 9/2011 | |
| WO | 2017/038082 A1 | 3/2017 | |

OTHER PUBLICATIONS

The extended European search report for the corresponding European application No. 20185886.7, dated Nov. 30, 2020.

* cited by examiner

*Primary Examiner* — Donald L Raleigh
(74) *Attorney, Agent, or Firm* — Global IP Counselors, LLP

(57) ABSTRACT

A lighting device includes a light source, a light diffusion plate, and a sheet-like optical member. The light diffusion plate is arranged opposite the light source. The light diffusion plate diffuses light from the light source. The optical member is disposed between the light diffusion plate and the light source. The optical member includes a transmitting part that transmits the light emitted from the light source and a reflecting part that reflects the light emitted from the light source. The optical member is supported by a support portion that is integrally provided to the light diffusion plate.

20 Claims, 6 Drawing Sheets

LIGHTING DEVICE AND DISPLAY DEVICE

CROSS-REFERENCE TO RELATED APPLICATIONS

This application claims priority to Japanese Patent Application No. 2019-134023 filed on Jul. 19, 2019. The entire disclosure of Japanese Patent Application No. 2019-134023 is hereby incorporated herein by reference.

BACKGROUND

Field of the Invention

The invention relates to a lighting device and a display device.

Background Information

Conventionally, display devices are known (see International Publication WO 2017/038082 (Patent Literature 1), for example).

The above-described Patent Literature 1 discloses a display device that includes a light source, a sheet-like optical member that is disposed opposite the light source and includes a transmitting part that transmits the light emitted from the light source and a reflecting part that reflects the light emitted from the light source, and a plurality of columnar support members that support the sheet-like optical member. In the display device of Patent Literature 1, in order to suppress the undulation of the sheet-like optical member, the plurality of the columnar support members are provided for each light source.

SUMMARY

However, in Patent Literature 1, in order to suppress the undulation of the sheet-like optical member, the plurality of the columnar support members are provided for each light source, which requires a large number of support members to support the optical member. Thus, there is a problem that the number of parts increases.

One object is to provide a lighting device and a display device with which it is possible to prevent the undulation of a sheet-like optical member while limiting the increase in the number of parts.

In view of the state of the known technology and in accordance with a first aspect of the present invention, a lighting device comprises a light source, a light diffusion plate, and a sheet-like optical member. The light diffusion plate is arranged opposite the light source. The light diffusion plate diffuses light from the light source. The optical member is disposed between the light diffusion plate and the light source. The optical member includes a transmitting part that transmits the light emitted from the light source and a reflecting part that reflects the light emitted from the light source. The optical member is supported by a support portion that is integrally provided to the light diffusion plate.

In view of the state of the known technology and in accordance with a second aspect of the present invention, a display device comprises a display panel, and a backlight disposed rearward of the display panel. The backlight emits light to the display panel. The backlight includes a light source, a light diffusion plate, and a sheet-like optical member. The light diffusion plate is arranged opposite the light source. The light diffusion plate diffuses light from the light source. The optical member is disposed between the light diffusion plate and the light source. The optical member includes a transmitting part that transmits the light emitted from the light source and a reflecting part that reflects the light emitted from the light source. The optical member is supported by a support portion that is integrally provided to the light diffusion plate.

BRIEF DESCRIPTION OF THE DRAWINGS

Referring now to the attached drawings which form a part of this original disclosure.

DETAILED DESCRIPTION OF EMBODIMENTS

Selected embodiments will now be explained with reference to the drawings. It will be apparent to those skilled in the art from this disclosure that the following descriptions of the embodiments are provided for illustration only and not for the purpose of limiting the invention as defined by the appended claims and their equivalents.

First Embodiment (Configuration of Liquid Crystal Television Apparatus)

Referring to FIGS. 1 to 8, the configuration of a liquid crystal television apparatus 100 according to a first embodiment will be described. The liquid crystal television apparatus 100 is an example of the "display device" of the present disclosure.

Figure 1:
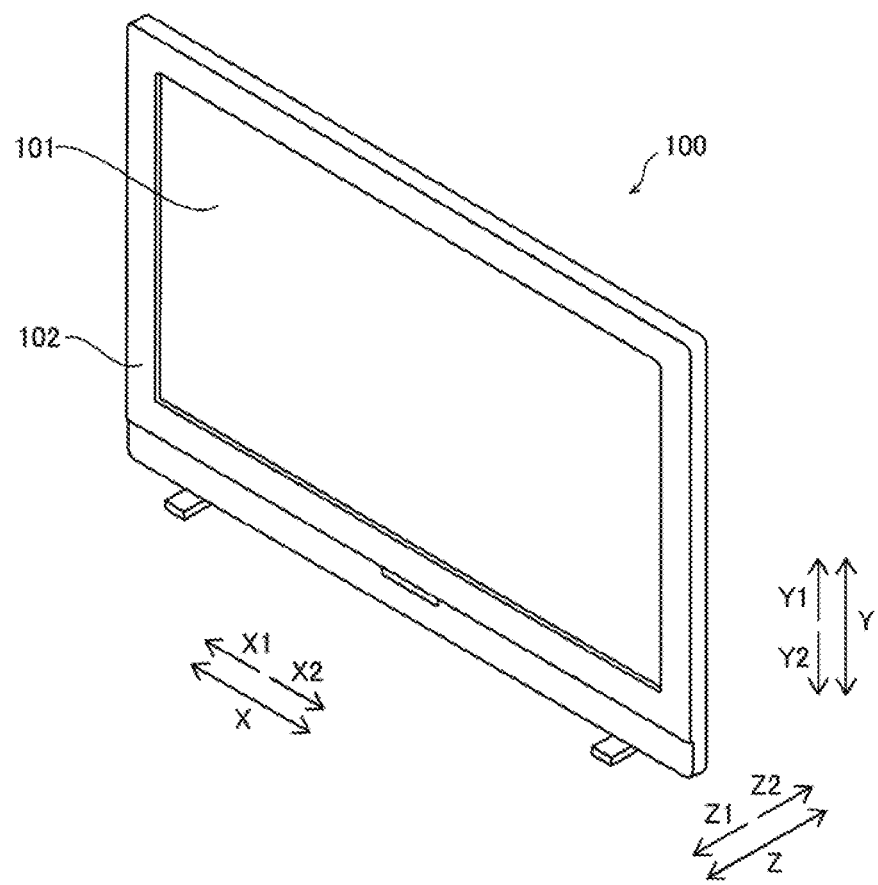
FIG. 1 is a perspective view showing the overall configuration of a liquid crystal television apparatus according to a first embodiment.
Figure 2:
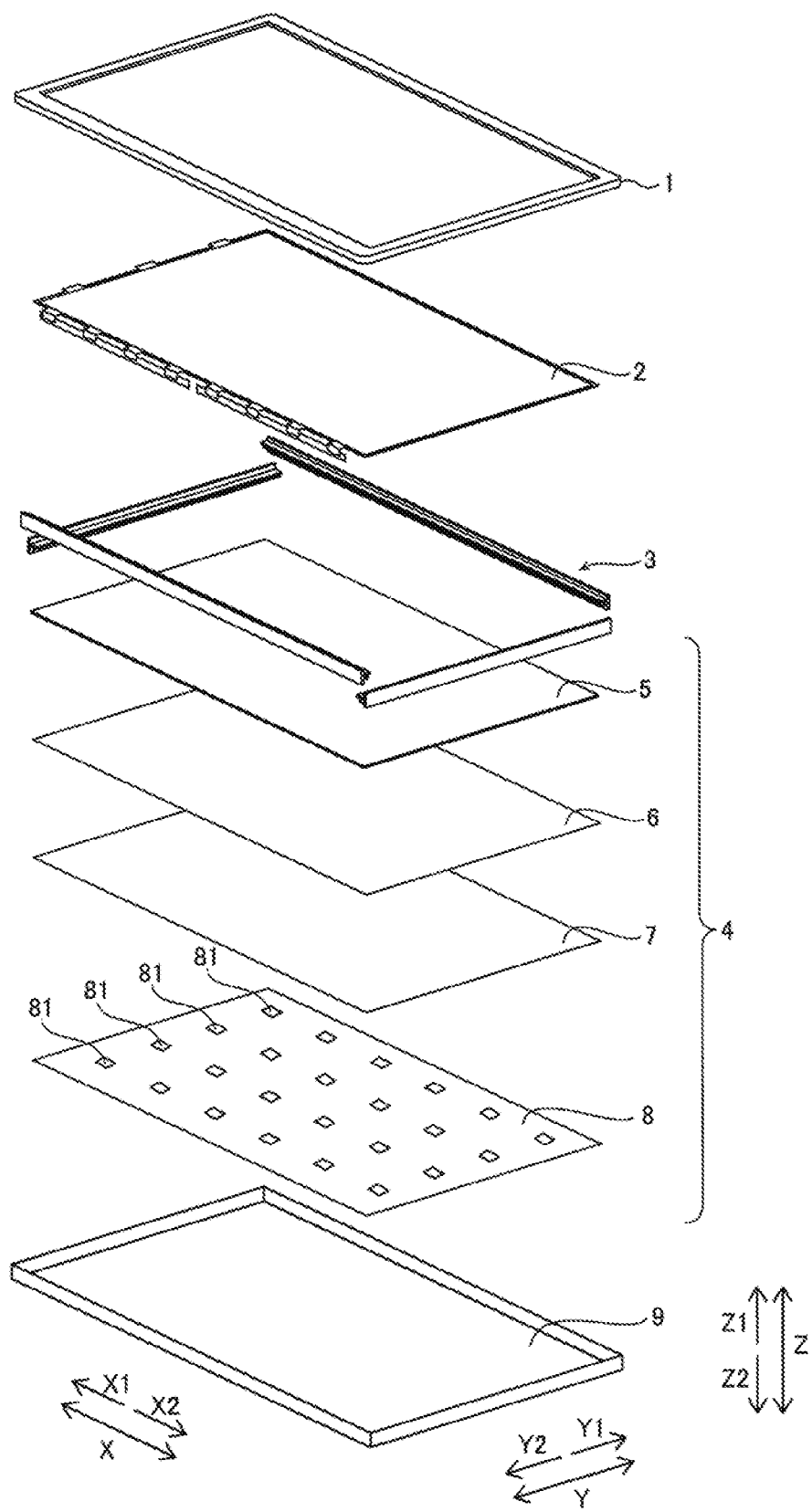
FIG. 2 is an exploded perspective view of the liquid crystal television apparatus in accordance with the first embodiment.

The liquid crystal television apparatus 100 according to the first embodiment includes, as shown in FIG. 1, a display section 101 and a housing 102. As shown in FIG. 2, the liquid crystal television apparatus 100 has a front housing 1, a display panel 2, an intermediate frame 3, a backlight 4, and a rear housing 9. The backlight 4 has a light diffusion plate 5, an optical member or optical sheet 6, a reflective sheet 7, and a substrate 8. The substrate 8 is provided with a plurality of light sources 81, The backlight 4 is an example of the "lighting device" of the present disclosure.

The front housing 1 is formed, for example, of a resin. The front housing 1 is configured to support the display panel 2 from the front side (Z1 direction side), In addition, a rectangular opening is provided in the center of the front housing 1 to expose a display surface of the display panel 2 on the front side (Z1 direction side).

The display panel 2 includes a liquid crystal cell. The display panel 2 includes a plurality of pixels, and by each of the plurality of pixels, images are displayed by changing the transmittance of light emitted from the light sources 81. The display panel 2 is driven based on video signal.

The intermediate frame 3 is configured to support the display panel 2 from the lateral side (X1 direction side and X2 direction side) and the vertical direction (Y1 direction side and Y2 direction side).

The backlight 4 is disposed on the back side or rearward (Z2 direction side) of the display panel 2. The backlight 4 is configured to emit light toward the display panel 2 from the back side of the display panel 2.

The light diffusion plate 5 has predetermined optical properties for diffusing the light from the light sources 81. The light diffusion plate 5 is configured in the form of a substantially rectangular plate. The light diffusion plate 5 is disposed between the display panel 2 and the light sources 81. The light diffusion plate 5 is disposed opposite the light sources 81. The light diffusion plate 5 is disposed at a location on the Z2 direction side of the display panel 2 so as to face a back surface of the display panel 2 in the Z direction. The light diffusion plate 5 is arranged so as to be sandwiched between the rear housing 9 and the intermediate frame 3 that supports the display panel 2.

The light diffusion plate 5 is formed by a resin. The light diffusion plate 5 is formed, for example, of polycarbonate. The light diffusion plate 5 has a thickness (Z direction length) of about a few millimeters (between 1 mm and 5 mm (i.e., 1 mm≤the thickness of the light diffusion plate 5≤5 mm)). The light diffusion plate 5 has a larger thickness than the optical member 6. This makes the light diffusion plate 5 less likely to warp than the optical member 6.

Figure 3:
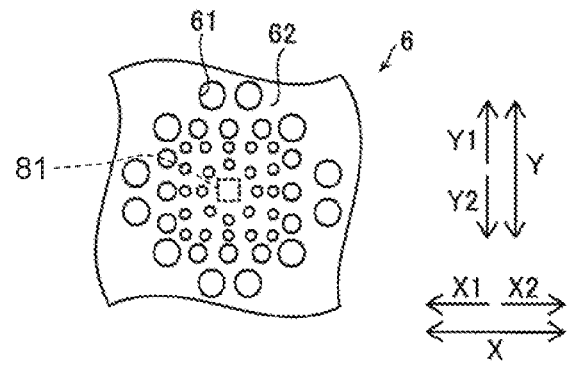
FIG. 3 is a front view showing an optical member.

The optical member 6 is disposed between the light diffusion plate 5 and the light sources 81. As shown in FIG. 3, the optical member 6 has a plurality of transmitting parts 61 that transmit the light emitted from the light sources 81, and a reflecting part 62 that reflects the light emitted from the light sources 81. The optical member 6 is formed in the form of a sheet, as shown in FIG. 2. The optical member 6 is disposed at a location on the Z2 direction side of the light diffusion plate 5 so as to face a back surface of the light diffusion plate 5 in the Z direction. The optical member 6 is arranged so as to be sandwiched between the rear housing 9 and the intermediate frame 3 that supports the display panel 2.

The optical member 6 is formed of a resin. The optical member 6 is thrilled, for example, of a micro-cellular formed plastic. The optical member 6 is formed of a micro-cellular foamed polyethylene terephthalate. The optical member 6 has a thickness (Z direction length) of 0.8 mm or less. The optical member 6 has a smaller thickness than the light diffusion plate 5.

Figure 5:
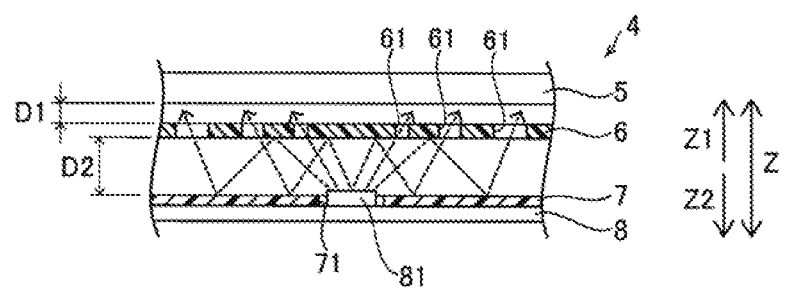
FIG. 5 is a cross-sectional view taken along V-V line in FIG. 4.

The transmitting parts 61 of the optical member 6 each include a plurality of through holes that penetrate the optical member 6 in the thickness direction (Z direction) as shown in FIGS. 3 and 5. The plurality of the transmitting parts 61 are provided, and are arranged to have a predetermined pattern depending on a positional relationship relative to the light sources 81. Specifically, as shown in FIG. 3, the transmitting parts 61 are each provided for respective one of the light sources 81. Thus, the plurality of the through holes of each of the transmitting parts 61 are provided relative to the respective one of the light sources 81. Specifically, as shown in FIG. 3, the plurality of the through holes are circumferentially arranged along concentric circles that are concentric with respect to the respective one of the light sources 81, as viewed in Z direction. The plurality of the through holes also include different sizes of through holes. The reflecting part 62 of the optical member 6 is a portion (e.g., remainder portion) of the optical member 6 other than where the through holes are provided. The reflecting part 62 is configured to reflect most of the incident light. The optical member 6 is configured to make the light emitted forward (Z1 direction) have a uniform light intensity in the plane direction (XY direction) by adjusting the transmission of the light by the transmitting part 61 at each position.

Also, as shown in FIG. 5, the optical member 6 is arranged substantially in parallel with the light diffusion plate 5 and spaced apart from the light diffusion plate 5 by a predetermined spacing D1. For example, the optical member 6 is disposed spaced apart from the light diffusion plate 5 by the spacing D1 of 0.2 mm or more and 2 mm or less. This spacing D1 causes the light transmitted or reflected by the optical member 6 in the Z1 direction side to be diffused, and the light intensity becomes more uniform. The optical member 6 is arranged substantially in parallel with the reflective sheet 7 and spaced apart from the reflective sheet 7 by a predetermined spacing D2. For example, the optical member 6 is disposed spaced apart from the reflective sheet 7 by the spacing D2 of about several millimeters.

The optical member 6 also has a plurality of through holes 63 (see FIGS. 6 to 8) as engagement portions to which support portions (first support portions 51a and second support portions 51b) are inserted.

As shown in FIG. 2, the reflective sheet 7 is disposed on an inner surface of the rear housing 9 and is configured to reflect the light emitted from the light sources 81 to the front side (Z1 direction side). The reflective sheet 7 is disposed on the side of the light sources 81 with respect to the optical member 6. As shown in FIG. 5, the reflective sheet 7 includes a plurality of light source openings 71. The light sources 81 are arranged to protrude through the light source openings 71 to the optical member 6 side (Z1 direction side) of the reflective sheet 7.

The reflective sheet 7 is formed of a resin. The reflective sheet 7 is formed, for example, of a micro-cellular formed plastic. The reflective sheet 7 is formed of a micro-cellular foamed polyethylene terephthalate.

Figure 4:
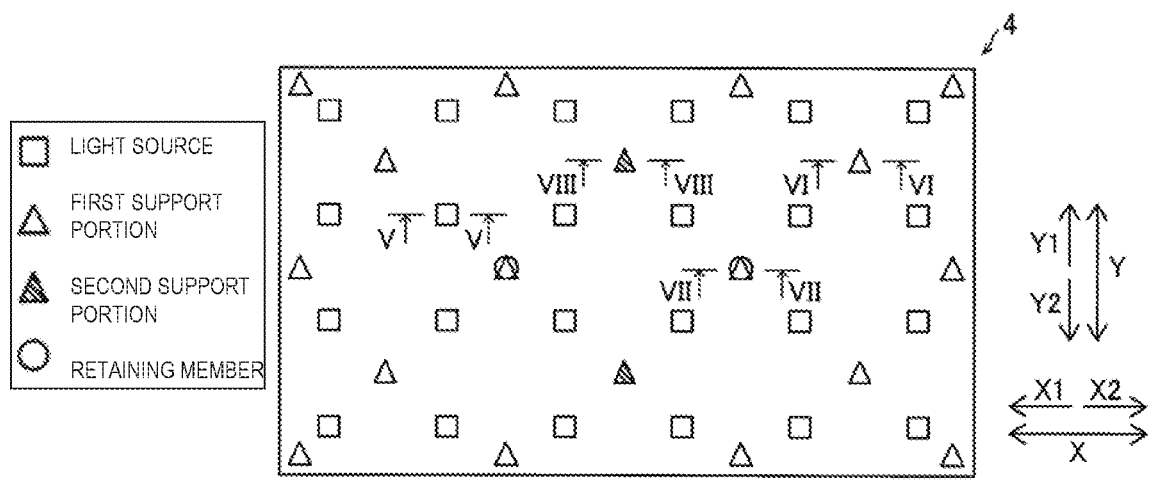
FIG. 4 is a front view showing support positions of the optical member of a backlight according to the first embodiment.

The plurality of the light sources 81 are provided on the substrate 8. The substrate 8 is disposed on the back side (Z2 direction side) of the reflective sheet 7. The light sources 81 include a light-emitting element. The light sources 81 are configured to emit the light by being energized. The light sources 81 include, for example, a light emitting diode (LED). The light sources 81 are electrically coupled to the substrate 8 so as to be energized. The light sources 81 are supported by the rear housing 9 via the substrate 8. The plurality of the light sources 81 are, for example, arranged in a matrix in the XY directions, as shown. in FIG. 4. In the first embodiment, as shown in FIG. 4, the backlight 4 includes twenty-four light sources 81, shown by squares in FIG. 4.

The rear housing 9 is configured to support the display panel 2 from the rear side (Z2 direction side), as shown in FIG. 2. The rear housing 9 is formed of metal, for example, and formed in a concave shape that is depressed in the rear direction (Z2 direction). The rear housing 9 is assembled with the front housing 1.

Figure 6:
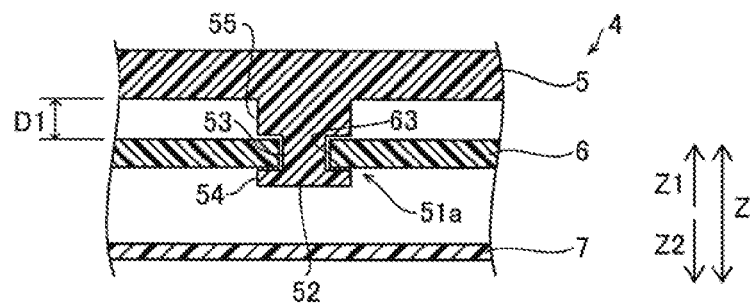
FIG. 6 is a cross-sectional view taken along VI-VI line in FIG. 4.
Figure 7:
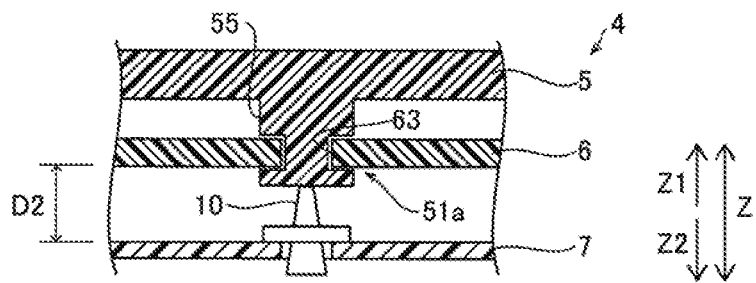
FIG. 7 is a cross-sectional view taken along VII-VII line in FIG. 4.
Figure 8:
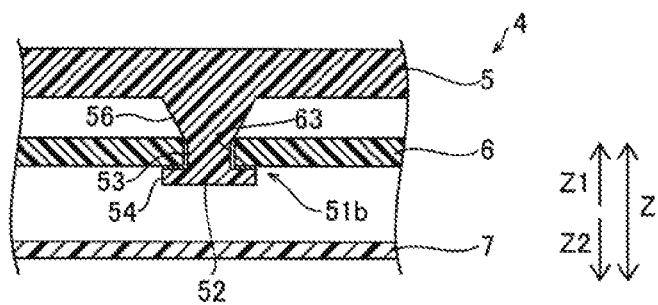
FIG. 8 is a cross-sectional view taken along VIII-VIII line of FIG. 4.

Here, in the first embodiment, the optical member 6 is supported by the support portions (the first support portions 51a and the second support portions 51b) that are integrally provided to the light diffusion plate 5, as shown in FIGS. 6 to 8. Specifically, as shown in FIGS. 6 and 8, the support portions (the first support portions 51a, and second support portions 51b) include convex portions 52 that are integrally provided to the light diffusion plate 5 and protrude toward the light sources 81 (Z2 direction side). The optical member 6 includes the engagement portions (the through holes 63) that are engaged with the convex portions 52. In the first embodiment, the support portions (the first support portions 51a and second support portions 51b) has circular cross-sectional shapes at any locations along the center axes of the support portions, taken by planes perpendicular to the center axes of the support portions, for example. However, the support portions can be configured to have different cross-sectional shapes other than the circular cross-sectional shapes.

More specifically, the convex portions 52 each includes a shaft portion 53 that extends to the light source 81 side (Z2 direction side) and a widening portion 54 that has a larger diameter than the shaft portion 53 and is disposed at the end of the shaft portion 53. While the optical member 6 is disposed between the light diffusing surface the front surface or the rear surface) of the light diffusion plate 5 and the widening portions 54 of the convex portions 52, the engagement portions (the through holes 63) of the optical member 6 are engaged with the shaft portions 53 and the widening portions 54 of the convex portions 52.

As shown in FIG. 4, the support portions (the first support portions 51a and the second support portions 51b) are disposed between the plurality of the light sources 81 and along the edges surrounding the light sources 81. Two second support portions 51b, shown by hatched triangles in FIG. 4, are disposed near the center in the left and right direction (X direction). The two second support portions 51b are disposed spaced apart from each other by a predetermined spacing in the vertical direction (Y direction). Sixteen first support portions 51a, shown by unhatched triangles in FIG. 4, are provided to the backlight 4. Specifically, the first support portions 51a (ten first support portions 51a) are provided on an outer peripheral portion in the X and Y directions. Also, the first support portions 51a (six first support portions 51a) are provided between the plurality of the light sources 81. The support portions (the first support portions 51a and the second support portions 51b) are provided in a smaller number than the number of the light sources 81. That is, one support portion (the first support portion 51a or the second support portion 51b) is arranged for a plurality of the light sources 81. Specifically, in the first embodiment, as shown in FIG. 4, eighteen support portions (sixteen first support portions 51a and two second support portions) are provided for twenty-four light sources 81.

In addition, as shown in FIGS. 6 to 8, with the support portions (the first support portions 51a and the second support portions 51b), the widening portions 54 are formed by swaging distal ends of the shaft portions 53 of the convex portions 52. For example, the support portions (the first support portions 51a and the second support portions 51b) are swaged by ultrasonic swaging to form the widening portions 54. Here, swaging means deforming the distal ends of the convex portions 52 so that the convex portions 52 and the optical member 6 are engaged with each other.

In other words, while the convex portions 52 are inserted into the through holes 63 in the optical member 6, the distal ends arc deformed to form the widening portions 54. This causes the support portions (the first support portions 51a and the second support portions 51b) to engage with the optical member 6. In the first embodiment, as shown in FIGS. 6 to 8, with each of the support portions (the first support portions 51a and the second support portions 51b), the shaft portion 53 and the widening portion 54 are coaxially arranged with respect to each other.

As shown in FIG. 6, the light diffusion plate 5 is provided with a plurality of spacer portions or spacers 55 between the light diffusion plate 5 (e.g., the rear surface of the light diffusion plate 5) and the optical member 6 (e.g., the front surface of the optical member 6) such that the light diffusion plate 5 and the optical member 6 are arranged substantially in parallel with each other and spaced apart by the predetermined spacing D1. The spacer portions 55 have a larger diameter than the shaft portions 53. The spacer portions 55 have a larger diameter than the diameter of the through holes 63 of the optical member 6. The spacer portions 55 are integrally provided with the first support portions 51a, respectively. Thus, as understood from FIG. 4, in the first embodiment, sixteen spacer portions 55 are provided to the backlight 4 at locations of sixteen first support portions 51a. Also, in the first embodiment, the first support portions 51a and the spacer portions 55 are coaxially arranged with respect to each other. This forms a layer of air of a certain thickness with an optical diffusion effect between the optical member 6 and the light diffusion plate 5, and thus the increase of the thickness (Z direction length) can be suppressed while maintaining the uniformity of the brightness of the light exiting surface. In other words, because the sensitivity of robustness due to the positional shift between the light sources 81 and the optical member 6 in the XY direction is reduced, the degree of freedom in design can be ensured. This makes it possible to ensure the uniformity of the brightness even when the thickness is reduced. In the first embodiment, the spacer portions 55 has circular cross-sectional shapes at any locations along the center axes of the support portions, taken by planes perpendicular to the center axes of the support portions, for example. However, the spacer portions 55 can be configured to have different cross-sectional shapes other than the circular cross-sectional shapes.

As shown in FIG. 6, the first support portions 51a are inserted to the through holes 63 (e.g., first through holes of the through holes 63) of the optical member 6 with a gap in the radial direction of the through holes 63 (e.g., the first through holes of the through holes 63). The first support portions 51a are inserted to the through holes 63 with a gap between 0.1 mm to 0.5 mm, for example.

As shown in FIG. 8, the second support portions 51b are inserted to the through holes 63 (e.g., second through holes of the through holes 63) in contact with inner surfaces of the through holes 63 (e.g., the second through holes of the through holes 63) of the optical member 6. The second support portions 51b each have a tapered portion 56 in the shape of tapering off from the Z1 direction side to the Z2 direction side. In other words, the tapered portion 56 tapers off as moving rearward (Z2 direction). The tapered portion 56 has a Z2 direction side end that has a smaller diameter than the diameter of the through hole 63, and a Z1 direction side end that has a larger diameter than the diameter of the through hole 63. In other words, the tapered portion 56 is in contact with the through hole 63 at a portion that has the same diameter as the through hole 63. This allows the difference in linear expansion between the members to be absorbed, and thereby ensuring the robustness of the design. In the first embodiment, the tapered portions of the second support portions 51b are mainly located between the rear surface of the light diffusion plate 5 and the optical member 6.

As shown in FIG. 7, a plurality of retaining members or retainers 10 support the first support portions 51a. The retaining members 10 retain the reflective sheet 7 and the optical member 6 to be in substantially parallel with each other and be separated by the predetermined spacing D2, and are provided between the reflective sheet 7 and the optical member 6. The retaining members 10 are arranged to contact with the first support portions 51a to which the spacer portions 55 are provided.

As shown in FIG. 4, in the first embodiment, two retaining members 10, shown by circles in FIG. 4, are located near the center in the vertical direction (Y direction). Specifically, the two retaining members 10 are located rearward (Z2 direction) relative to two of the first support portions 51a so as to align with the two of the first support portions as viewed in Z direction.

Effects of First Embodiment

In the first embodiment, the following effects can be obtained.

In the first embodiment, as described above, the optical member 6 is supported by the support portions (the first support portions 51a and the second support portions 51b) that are integrally provided to the light diffusion plate 5 as described above. This makes it possible to support the sheet-like optical member 6 by the first support portions 51a and the second support portions 51b that are integrally provided to the light diffusion plate 5 while avoiding the undulation of the optical member 6, and thus there is no need to provide a large number of columnar support members to support the sheet-like optical member 6. As a result, the undulation of the sheet-like optical member 6 can be suppressed while the increase of the number of parts is suppressed. This allows the shape of the sheet-like optical member 6 to be maintained constant, and thus it is possible to suppress the occurrence of unevenness in the intensity of the irradiated light depending on the position. In addition, since there is no need to provide a large number of columnar support members, it is possible to prevent the light from the light sources 81 from being blocked due to the columnar support members. This can also suppress the unevenness in the intensity of the irradiated light depending on the position.

Also, in the first embodiment, as described above, the support portions (the first support portions 51a and the second support portions 51b) include the convex portions 52 that are integrally provided to the light diffusion plate 5 and protrude on the light source 81 side, and the optical member 6 includes the engagement portions (the through holes 63) that engage the convex portions 52. In this configuration, the optical member 6 can be easily supported by engaging the convex portions 52 that are integrally provided to the light diffusion plate 5 with the engagement portions (the through holes 63) of the optical member 6.

Also, in the first embodiment, as described above, the convex portions 52 each have the shaft portion 53 that extends toward the light source 81 side and the widening portion 54 that is disposed at the end of the shaft portion 53 and has a larger diameter than the shaft portion 53, and the engagement portions (the through holes 63) of the optical member 6 are engaged with the shaft portions 53 and the widening portion 54 of the convex portions 52 while the optical member 6 is disposed between the light diffusing surface of the light diffusion plate 5 and the widening portions of the convex portions 52. In this configuration, the shaft portions 53 and the widening portions 54 securely engage the convex portions 52 with the optical member 6.

Also, in the first embodiment, as described above, the support portions (the first support portions 51a and the second support portions 51b) are configured such that the widening portions 54 are formed by swaging the ends of the shaft portions 53 of the convex portions 52. In this configuration, unlike the case where the optical member 6 is engaged with the convex portions while deforming the optical member 6, the deformation of the optical member 6 can be suppressed, and thus the occurrence of the undulation due to the deformation of the optical member 6 can be suppressed.

Also, in the first embodiment, as described above, the light diffusion plate 5 is provided with the spacer portions 55 between the light diffusion plate 5 and the optical member 6 such that the light diffusion plate 5 and the optical member 6 are arranged substantially in parallel to each other at the predetermined spacing. With this configuration, the distance between the light diffusion plate 5 and the optical member 6 can be kept constant, and thus the occurrence of the unevenness in the intensity of the irradiated light depending on the position can be effectively suppressed.

Also, in the first embodiment, as described above, the spacer portions 55 are provided integrally with the first support portions 51a. In this configuration, compared to the case where the first support portions 51a, and the spacer portions 55 are provided separately, the structure of the light diffusion plate 5 provided with the first support portions 51a and the spacer portions 55 can be prevented from becoming complicated and the increase in the number of parts can be suppressed.

Also, in the first embodiment, as described above, the retaining members 10 are provided that supports the first support portions 51a, retains the reflective sheet 7 and the optical member 6 such that the reflective sheet 7 and the optical member 6 are arranged in substantially parallel to each other and separated by the predetermined spacing, and is provided between the reflective sheet 7 and the optical member 6. In this configuration, the retaining members 10 can maintain a constant distance between the light sources 81 and the optical member 6, and thus it is possible to effectively suppress the occurrence of the unevenness in the intensity of the irradiated light depending on the position.

Also, in the first embodiment, as described above, the first support portions 51a that are inserted to the through holes 63 of the optical member 6 with a gap in the radial direction of the through holes 63 and the tapered second support portions 51b that are inserted to the through holes 63 in contact with the inner surfaces of the through holes 63 of the optical member 6. In this configuration, the tapered second support portions 51b can position the optical member 6 in the plane direction (XY direction) of the optical member 6, and a play can be provided between the first support portions 51a and the through holes 63 of the optical member 6. As a result, the optical member 6 is not excessively constrained even when it expands due to heat or other causes, and thus it is possible to effectively suppress the occurrence of the undulation in the optical member 6.

Modification Example of First Embodiment

Figure 9:
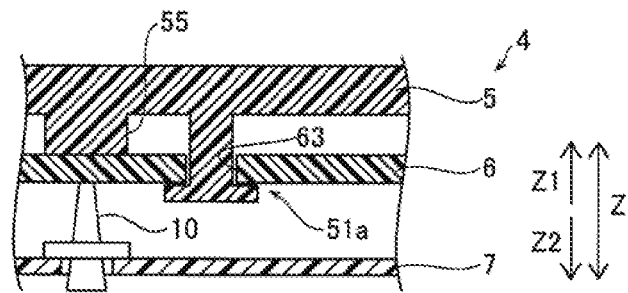
FIG. 9 is a side cross-sectional view showing support of the optical member by a light diffusion plate according to a modification example of the first embodiment.

Referring to FIG. 9, the configuration of a backlight 4 of a liquid crystal television apparatus 100 according to a modification example of the first embodiment will be explained. The liquid crystal television apparatus 100 is an example of the "display device" of the present disclosure, and the backlight 4 is an example of the "lighting device" of the present disclosure.

As shown in FIG. 9, with the backlight 4 according to the modification example of the first embodiment, a plurality of retaining members 10 support an optical member 6 at positions corresponding to a plurality of spacer portions 55. Specifically, the spacer portions 55 are provided separately from first support portions 51a. Thus, the first support portions 51a and the spacer portions 55 are arranged spaced apart from each other, as shown in FIG. 9. The spacer portions 55 are provided in the vicinity of the first support portions 51a. The retaining members 10 support the spacer portions 55 through the optical member 6. That is, the optical member 6 is sandwiched between the retaining members 10 and the spacer portions 55.

Other configurations of the modification example of the first embodiment is the same as the first embodiment above.

Second Embodiment

Next, referring to FIGS. 10 to 12, the configuration of a backlight 4 of a liquid crystal television apparatus 100 according to a second embodiment will be explained. In the second embodiment, unlike the first embodiment, an example of a configuration in which support potions (first support portions 51a and second support portions 51b) are in contact with the reflective sheet 7 without having the retaining members 10 will be explained. The liquid crystal television apparatus 100 is an example of the "display device" of the present disclosure, and the backlight 4 is an example of the "lighting device" of the present disclosure. In view of the similarity between the first and second embodiments, the parts of the second embodiment that are identical to or correspond to the parts of the first embodiment will be given the same reference numerals as the parts of the first embodiment. Moreover, the descriptions of the parts of the second embodiment that are identical to or correspond to the parts of the first embodiment may be omitted for the sake of brevity.

Figure 11:
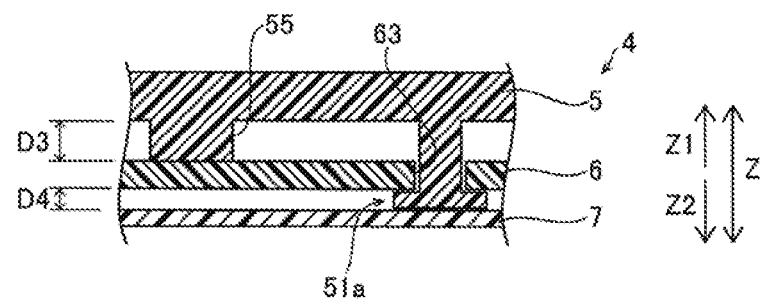
FIG. 11 is a cross-sectional view taken along XI-XI line in FIG. 10.
Figure 12:
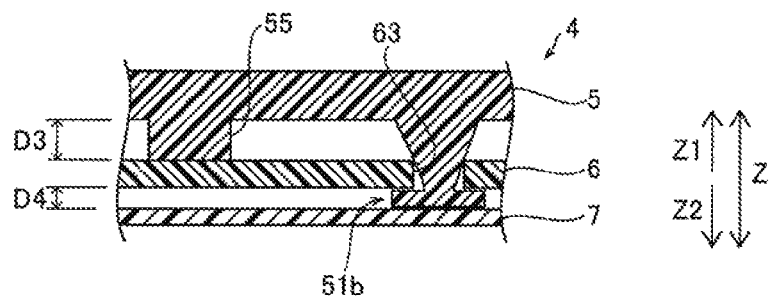
FIG. 12 is a cross-sectional view taken along XII-XII line in FIG. 10.

Here, in the second embodiment, as shown in FIGS. 11 and 12, an optical member 6 is supported by the support portions (the first support portions 51a and the second support portions 51b) that are integrally provided to a light diffusion plate 5. Also, in the second embodiment, the support portions (the first support portions 51a and the second support portions 51b) are in contact with the reflective sheet 7 so that the reflective sheet 7 and the optical member 6 are arranged substantially in parallel with each other and separated by a predetermined spacing S4. In other words, the support portions (the first support portions 51a and the second support portions 51b) are engaged with the optical member 6 and support the light diffusion plate 5.

Figure 10:
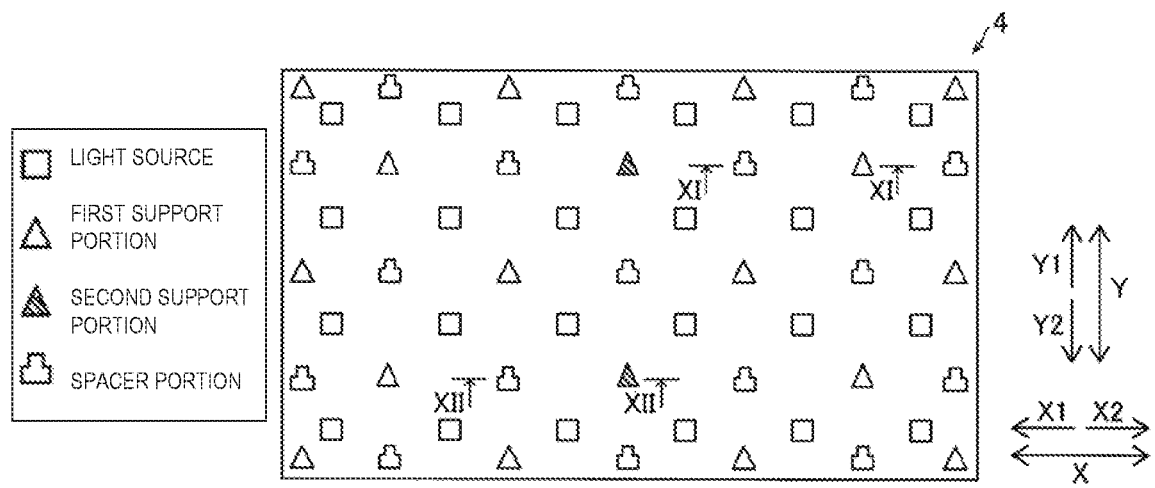
FIG. 10 is a front view showing support positions of an optical member of a backlight according to a second embodiment.

As shown in FIG. 10, the support portions (the first support portions 51a and the second support portions 51b) are disposed between a plurality of light sources 81 and along the edges surrounding the light sources 81. The arrangements of the support portions (the first support portions 51a and the second support portions 51b) in the second embodiment is identical to the arrangements in the first embodiment. Thus, two second support portions 51b, shown by hatched triangles in FIG. 10, are disposed near the center in the left and right direction (X direction). The two second support portions 51b are disposed spaced apart from each other by a predetermined spacing in the vertical direction (Y direction). Sixteen first support portions 51a, shown by unhatched triangles in FIG. 10, are provided to the backlight 4. Specifically, the first support portions 51a (ten first support portions 51a) are provided on an outer peripheral portion in the X and Y directions. Also, the first support portions 51a (six first support portions 51a) are provided between the plurality of the light sources 81. The support portions (the first support portions 51a and the second support portions 51b) are provided in a smaller number than the number of the light sources 81. That is, one support portion (the first support portion 51a or the second support portion 51b) is arranged fora plurality of the light sources 81. Specifically, in the second embodiment, as shown in FIG. 10, eighteen support portions (sixteen first support portions 51a and two second support portions) are provided for twenty-four light sources 81.

In the second embodiment, as shown in FIGS. 10 to 12, a plurality of (seventeen in FIG. 10) spacer portions 55, shown by concave polygon in FIG. 10, are provided separately from the support portions (the first support portions 51a and the second support portions 51b). The spacer portions 55 are disposed between the plurality of the light sources 81 and along the edges surrounding the light sources 81. Specifically, seven spacer portions 55 are disposed between the plurality of the light sources 81 and ten spacer portions 55 are disposed along the edges surrounding the light sources 81. The ten spacer portions 55 disposed along the edges surrounding the light sources 81 are also disposed between adjacent pairs of the ten first support portions 51a that are provided on the outer peripheral portion in the X and Y directions. The spacer portions 55 are provided between the light diffusion plate 5 and the optical member 6 such that the light diffusion plate 5 and the optical member 6 are arranged substantially in parallel with each other and separated by a predetermined spacing D3. The spacer portions 55 are integrally provided with the light diffusion plate 5.

Other configurations of the second embodiment are the same as the first embodiment above.

Effect of Second Embodiment

In the second embodiment, as in the first embodiment above, the optical member 6 is supported by the support portions (the first support portions 51a and the second support portions 51b) that are integrally provided with the light diffusion plate 5. With this configuration, the undulation of the sheet-like optical member 6 can be suppressed while the increase of the number of parts is suppressed.

Also, in the second embodiment, as described above, the light diffusion plate 5 is supported by the support portions (the first support portions 51a and the second support portions 51b) that are integrally provided with the light diffusion plate 5. This allows the number of parts to be reduced compared to the case where the light diffusion plate 5 is supported by the support members.

Other effects of the second embodiment are the same as in the first embodiment.

First Modification Example of Second Embodiment

With reference to FIG, 13, the configuration of a backlight 4 of a liquid crystal television apparatus 100 according to a first modification example of the second embodiment will be explained. The liquid crystal television apparatus 100 is an example of the "display device" of the present disclosure, and the backlight 4 is an example of the "lighting device" of the present disclosure.

Figure 13:
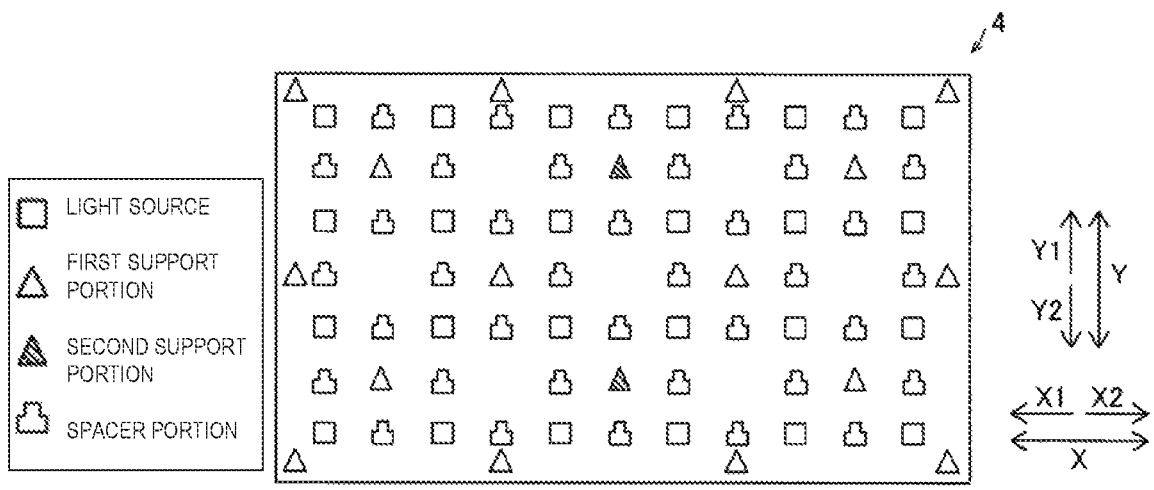
FIG. 13 is a front view showing support positions of an optical member of a backlight according to a first modification example of the second embodiment.

As shown in FIG. 13, with the backlight 4 according to the first modification example of the second embodiment is shown in FIG. 13, support portions (first support portions 51a, and second support portions 51b) are disposed between a plurality of light sources 81 and along the edges surrounding the light sources 81. The arrangements of the support portions (the first support portions 51a and the second support portions 51b) in the first modification example of the second embodiment is identical to the arrangements in the second embodiment shown in FIG. 10. Thus, two second support portions 51b, shown by hatched triangle in FIG. 13, are disposed near the center in the left and right direction (X direction). The two second support portions 51b are disposed spaced apart from each other by a predetermined spacing in the vertical direction (Y direction). Sixteen first support portions 51a, shown by unhatched triangles in FIG. 13, are provided to the backlight 4. Specifically, the first support portions 51a (ten first support portions 51a) are provided on an outer portion in the X and Y directions. Also, the first support portions 51a (six first support portions 51a) are provided between the plurality of the light sources 81. The support portions (the first support portions 51a and the second support portions 51b) are provided in a smaller number than the number of the light sources 81. That is, one support portion (the first support portion 51a or the second support portion 51b) is arranged for a plurality of the light sources 81.

In addition, a plurality of (thirty-eight in FIG. 13) spacer portions 55, shown by concave polygon in FIG. 13, are provided separately from the support portions (the first support portions 51a and the second support portions 51b). The spacer portions 55 are provided between the plurality of the light sources 81. Specifically, the spacer portions 55 are provided between adjacent light sources 81 in the vertical direction (Y direction). The spacer portions 55 are provided between adjacent light sources 81 in the left and right direction (X direction).

Other configurations of the first modification example of the second embodiment are the same as in the second embodiment above.

Second Modification Example of Second Embodiment

Figure 14:
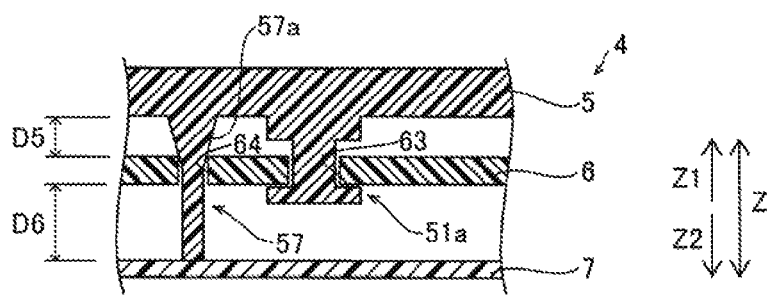
FIG. 14 is a side cross-sectional view showing support of an optical member by a light diffusion plate according to a second modification example of the second embodiment.

Referring to FIG. 14. the configuration of a backlight 4 of a liquid crystal television apparatus 100 according to a second modification example of the second embodiment will be explained. The liquid crystal television apparatus 100 is an example of the "display device" of the present disclosure, and the backlight 4 is an example of the "lighting device" of the present disclosure.

As shown in FIG. 14, with the backlight 4 according to the second modification example of the second embodiment, a light diffusion plate 5 is provided with pillar portions 57, separately from support portions (first support portions 51a and second support portions 51b). The pillar portions 57 are in contact with a reflective sheet 7 such that the reflective sheet 7 and an optical member 6 are arranged substantially in parallel with each other and separated by a predetermined spacing D6. In other words, the pillar portions 57 support the light diffusion plate 5.

The pillar portions 57 have tapered portions 57a between the light diffusion plate 5 and the optical member 6 such that the light diffusion plate 5 and the optical member 6 are arranged substantially in parallel with each other and separated by a predetermined spacing D5. The tapered portions 57a are engaged with through holes 64 in the optical member 6.

Other configurations of the second modification example of the second embodiment are the same as the second embodiment above.

MODIFICATION EXAMPLES

The embodiments disclosed here are illustrative and are not restrictive in all respects. The scope of the invention is indicated by the claims rather than by the description of the embodiments described above, and furthermore includes all modifications (modification examples) within the meaning and scope of the claims and their equivalents.

For example, in the first and second embodiments above, examples of the liquid crystal television apparatus are illustrated as a display device of the present invention, but the present invention is not limited to this. For example, the present invention can be applied to a display device other than a liquid crystal television apparatus. For example, a general display device such as a display device for personal computers (PC).

Also, in the first and second embodiments above, examples of the backlights are illustrated as a lighting device of the present invention, but the present invention is not limited to this. For example, the present invention can be applied to a lighting device other than a backlight of a display device. For example, the present invention can be applied to a lighting device with plane light emission.

Also, in the first and second embodiments above, examples of the configurations in which the support portions are formed by swaging are illustrated, but the present invention is not limited to this. In the present invention, the support portions can be formed by resin molding or by thermal deformation. The support portions can be formed by a swaging method other than the ultrasonic swaging.

In the first and second embodiments above, examples of the configuration that includes the first support portions formed without tapered portions and the second support portions formed with the tapered portions are illustrated, but the present invention is not limited to this. The present invention can include only one type of the first support portions formed without tapered portions and the second support portions formed with the tapered portions, and can include a type of support portions other than the first support portions and the second support portions.

Also, in the first and second embodiments above, examples of the configuration in which the rear frame is made to support the light diffusion plate are illustrated, but the present invention is not limited to this. In the present invention, a retaining member for the light diffusion plate can be provided separately from the rear frame, and the light diffusion plate can be supported by the retaining member for the light diffusion plate. In this case, the rear frame can support the retaining member for the light diffusion plate.

Also, in the first and second embodiments above, examples of the configuration in which the plurality of the light sources are arranged in a matrix in the XY directions are illustrated, but the present invention is not limited to this. In the present invention, for example, a plurality of light sources can be arranged in a row or in a staggered manner. A plurality of light sources can be arranged according to a predetermined rule.

[1] In view of the state of the known technology and in accordance with a first aspect of the present invention, a lighting device comprises a light source, a light diffusion plate, and a sheet-like optical member. The light diffusion plate is arranged opposite the light source. The light diffusion plate is configured to diffuse light from the light source. The optical member is disposed between the light diffusion plate and the light source, the optical member includes a transmitting part that is configured to transmit the light emitted from the light source and a reflecting part that is configured to reflect the light emitted from the light source. The optical member is supported by a support portion that is integrally provided to the light diffusion plate.

In the lighting device according to the first aspect of this invention, the optical member is supported by the support portion that is integrally provided to the light diffusion plate as described above. This makes it possible to support the sheet-like optical member by the support portion that is integrally provided to the light diffusion plate while avoiding the undulation of the optical member, and thus there is no need to provide a large number of columnar support members to support the sheet-like optical member. As a result, the undulation of the sheet-like optical member can be suppressed while the increase of the number of parts is suppressed. This allows the shape of the sheet-like optical member to be maintained constant, and thus it is possible to suppress the occurrence of unevenness in the intensity of the irradiated light depending on the position. In addition, since there is no need to provide a large number of columnar support members, it is possible to prevent the light from the light source from being blocked due to the columnar support members. This can also suppress the unevenness in the intensity of the irradiated light depending on the position.

[2] In accordance with a preferred embodiment according to the lighting device mentioned above, the support portion preferably has a convex portion that is integrally provided to the light diffusion plate and protrudes toward the light source, and the optical member has an engagement portion that engages the convex portion. In this configuration, the optical member can be easily supported by engaging the convex portion that is integrally provided to the light diffusion plate with the engagement portion of the optical member.

[3] In accordance with a preferred embodiment according to any one of the lighting devices mentioned above, the convex portion preferably has a shaft portion that extends toward the light source and a widening portion that is disposed at an end of the shaft portion and has a larger diameter than the shaft portion, and the engagement portion of the optical member is engaged with the shaft portion and the widening portion of the convex portion while the optical member is disposed between a light diffusing surface of the light diffusion plate and the widening portion of the convex portion. In this configuration, the shaft portion and the widening portion securely engage the convex portion with the engagement portion of the optical member.

[4] In accordance with a preferred embodiment according to any one of the lighting devices mentioned above, in the configuration in which the above-described convex portion has the shaft portion and the widening portion, the support portion is preferably configured such that the widening portion is formed by swaging the end of the shaft portion of the convex portion. In this configuration, unlike the case where the optical member is engaged with the convex portion while deforming the optical member, the deformation of the optical member can be suppressed, and thus the occurrence of the undulation due to the deformation of the optical member can be suppressed.

[5] in accordance with a preferred embodiment according to any one of the lighting devices mentioned above, the light diffusion plate is preferably provided with a spacer portion between the light diffusion plate and the optical member such that the light diffusion plate and the optical member are arranged substantially in parallel to each other and separated by a predetermined spacing. With this configuration, the distance between the light diffusion plate and the optical member can be kept constant, and thus the occurrence of the unevenness in the intensity of the irradiated light depending on the position can be effectively suppressed.

[6] in accordance with a preferred embodiment according to any one of the lighting devices mentioned above, the spacer portion is preferably integrally provided with the support portion. In this configuration, compared to the case where the support portion and the spacer portion are provided separately, the structure of the light diffusion plate provided with the support portion and the spacer portion can be prevented from becoming complicated and the increase in the number of parts can be suppressed.

[7] In accordance with a preferred embodiment according to any one of the lighting devices mentioned above, in the configuration in which the spacer portion is provided in the above light diffusion plate, the lighting device preferably further comprises a reflective sheet and a retaining member. The reflective sheet is disposed on a light source side with respect to the optical member. The reflective sheet is configured to reflect the light emitted from the light source. The retaining member is disposed between the reflective sheet and the optical member. The retaining member supports the support portion or the optical member at a position corresponding to the spacer portion. The retaining member is configured to retain the reflective sheet and the optical member such that the reflective sheet and the optical member are arranged in substantially parallel to each other and separated by a predetermined spacing. In this configuration, the retaining member can maintain a constant distance between the light source and the optical member, and thus it is possible to effectively suppress the occurrence of the unevenness in the intensity of the irradiated light depending on the position.

[8] In accordance with a preferred embodiment according to any one of the lighting devices mentioned above, the optical member is preferably provided with a plurality of through holes as an engagement portion to which the support portion is inserted, and the support portion includes a first support portion that is inserted to a first through hole of the through holes with a gap in a radial direction of the first through hole and a tapered second support portion that is inserted to a second through hole of the through holes in contact with an inner surface of the second through hole. In this configuration, the tapered second support portion can position the optical member in a plane direction of the optical member, and a play can be provided between the first support portion and the through hole of the optical member. As a result, the optical member is not excessively constrained even when it expands due to heat or other causes, and thus it is possible to effectively suppress the occurrence of the undulation in the optical member.

[9] in view of the state of the known technology and in accordance with a second aspect of the present invention, a display device comprises a display panel, and a backlight disposed rearward of the display panel. The backlight is configured to emit light to the display panel. The backlight includes a light source, a light diffusion plate, and a sheet-like optical member. The light diffusion plate is arranged opposite the light source. The light diffusion plate is configured to diffuse light from the light source. The optical member is disposed between the light diffusion plate and the light source. The optical member includes a transmitting part that is configured to transmit the light emitted from the light source and a reflecting part that is configured to reflect the light emitted from the light source. The optical member is supported by a support portion that is integrally provided to the light diffusion plate.

In the display device according to the second aspect of the present invention, the optical member is supported by the support portion that is integrally provided to the light diffusion plate as described above. This makes it possible to support the sheet-like optical member by the support portion that is integrally provided to the light diffusion plate while avoiding the undulation of the optical member, and thus there is no need to provide a large number of columnar support members to support the sheet-like optical member. As a result, it is possible to provide the display device with which the undulation of the sheet-like optical member can be suppressed while the increase of the number of parts is suppressed. This allows the shape of the sheet-like optical member to be maintained constant, and thus it is possible to suppress the occurrence of unevenness in the intensity of the irradiated light depending on the position. In addition, since there is no need to provide a large number of columnar support members, it is possible to prevent the light from the light source from being blocked due to the columnar support members. This can also suppress the unevenness in the intensity of the irradiated light depending on the position.

In accordance with a preferred embodiment according to the display device mentioned above, the support portion preferably has a convex portion that is integrally provided to the light diffusion plate and protrudes toward the light source, and the optical member has an engagement portion that engages the convex portion. In this configuration, the optical member can be easily supported by engaging the convex portion that is integrally provided to the light diffusion plate with the engagement portion of the optical member.

[11] in accordance with a preferred embodiment according to any one of the display devices mentioned above, the convex portion preferably has a shaft portion that extends toward the light source and a widening portion that is disposed at an end of the shaft portion and has a larger diameter than the shaft portion, and the engagement portion of the optical member is engaged with the shaft portion and the widening portion of the convex portion while the optical member is disposed between a light diffusing surface of the light diffusion plate and the widening portion of the convex portion. In this configuration, the shaft portion and the widening portion securely engage the convex portion with the engagement portion of the optical member.

[12] In accordance with a preferred embodiment according to any one of the display devices mentioned above, in the display device having the configuration in which the above-described convex portion has the shaft portion and the widening portion, the support portion is preferably configured such that the widening portion is formed by swaging the end of the shaft portion of the convex portion. In this configuration, unlike the case where the optical member is engaged with the convex portion while deforming the optical member, the deformation of the optical member can be suppressed, and thus the occurrence of the undulation due to the deformation of the optical member can be suppressed.

[13] In accordance with a preferred embodiment according to any one of the display devices mentioned above, the light diffusion plate is preferably provided with a spacer portion between the light diffusion plate and the optical member such that the light diffusion plate and the optical member are arranged substantially in parallel to each other and separated by a predetermined spacing. With this configuration, the distance between the light diffusion plate and the optical member can be kept constant, and thus the occurrence of the unevenness in the intensity of the irradiated light depending on the position can be effectively suppressed.

[14] In accordance with a preferred embodiment according to any one of the display devices mentioned above, the spacer portion is preferably integrally provided to the support portion. In this configuration, compared to the case where the support portion and the spacer portion are provided separately, the structure of the light diffusion plate provided with the support portion and the spacer portion can be prevented from becoming complicated and the increase in the number of parts can be suppressed.

[15] In accordance with a preferred embodiment according to any one of the lighting devices mentioned above, the transmitting part of the optical member includes a plurality of through holes arranged relative to the light source.

[16] In accordance with a preferred embodiment according to any one of the lighting devices mentioned above, the reflecting part of the optical member includes a remainder portion of the optical member other than the through holes.

[17] In accordance with a preferred embodiment according to any one of the lighting devices mentioned above, the shaft portion and the widening portion are coaxially arranged with respect to each other.

[18] In accordance with a preferred embodiment according to any one of the lighting devices mentioned above, the support portion and the spacer portion are coaxially arranged with respect to each other.

[19] In accordance with a preferred embodiment according to any one of the lighting devices mentioned above, the support portion and the spacer portion are arranged spaced apart from each other.

[20] in accordance with a preferred embodiment according to any one of the lighting devices mentioned above, the lighting device further comprises a reflective sheet disposed on a light source side with respect to the optical member, the reflective sheet being configured to reflect the light emitted from the light source, the support portion contacting the reflective sheet.

According to the present invention, as described above, it is possible to prevent the undulation of the sheet-like optical member while limiting the increase in the number of parts.

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts unless otherwise stated.

As used herein, the following directional terms "forward", "rearward", "front", "rear", "up", "down", "above", "below", "upward", "downward", "top", "bottom", " side", "vertical", "horizontal", "perpendicular" and "transverse" as well as any other similar directional terms refer to those directions of a liquid crystal television apparatus in an upright position. Accordingly, these directional terms should be interpreted relative to a liquid crystal television apparatus in an upright position on a horizontal surface.

The term "attached" or "attaching", as used herein, encompasses configurations in which an element is directly secured to another element by affixing the element directly to the other element; configurations in which the element is indirectly secured to the other element by affixing the element to the intermediate member(s) which in turn are affixed to the other element; and configurations in which one element is integral with another element, i.e. one element is essentially part of the other element. This definition also applies to words of similar meaning, for example, "joined", "connected", "coupled", "mounted", "bonded", "fixed" and their derivatives. Finally, terms of degree such as "substantially", "about" and "approximately" as used herein mean an amount of deviation of the modified term such that the end result is not significantly changed While only selected embodiments have been chosen to illustrate the present invention, it will be apparent to those skilled in the art from this disclosure that various changes and modifications can he made herein without departing from the scope of the invention as defined in the appended claims. For example, unless specifically stated otherwise, the size, shape, location or orientation of the various components can be changed as needed and/or desired so long as the changes do not substantially affect their intended function. Unless specifically stated otherwise, components that are shown directly connected or contacting each other can have intermediate structures disposed between them so long as the changes do not substantially affect their intended function. The functions of one element can he performed by two, and vice versa unless specifically stated otherwise. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

What is claimed is:

1. A lighting device comprising:
a light source;
a light diffusion plate arranged opposite the light source, the light diffusion plate diffusing light from the light source; and
a sheet-like optical member disposed between the light diffusion plate and the light source, the optical member including a transmitting part that transmits the light emitted from the light source and a reflecting part that reflects the light emitted from the light source,
the optical member being supported by a support portion that is integrally provided to the light diffusion plate.

2. The lighting device according to claim 1, wherein
the support portion has a convex portion that is integrally provided to the light diffusion plate and protrudes toward the light source, and
the optical member has an engagement portion that engages the convex portion.

3. The lighting device according to claim 2, wherein
the convex portion has a shaft portion that extends toward the light source and a widening portion that is disposed at an end of the shaft portion and has a larger diameter than the shaft portion, and
the engagement portion of the optical member is engaged with the shaft portion and the widening portion of the convex portion while the optical member is disposed between a light diffusing surface of the light diffusion plate and the widening portion of the convex portion.

4. The lighting device according to claim 3, wherein
the support portion is configured such that the widening portion is formed by swaging the end of the shaft portion of the convex portion.

5. The lighting device according to claim 1, wherein
the light diffusion plate is provided with a spacer portion between the light diffusion plate and the optical member such that the light diffusion plate and the optical member are arranged substantially in parallel to each other and separated by a predetermined spacing.

6. The lighting device according to claim 5, wherein
the spacer portion is integrally provided to the support portion.

7. The lighting device according to claim 5, further comprising
a reflective sheet disposed on a light source side with respect to the optical member, the reflective sheet reflecting the light emitted from the light source, and
a retaining member disposed between the reflective sheet and the optical member, the retaining member supporting the support portion or the optical member at a position corresponding to the spacer portion, the retaining member retaining the reflective sheet and the optical member such that the reflective sheet and the optical member are arranged in substantially parallel to each other and separated by a predetermined spacing.

8. The lighting device according to claim 1, wherein
the optical member is provided with a plurality of through holes as an engagement portion to which the support portion is inserted, and
the support portion includes a first support portion that is inserted to a first through hole of the through holes with a gap in a radial direction of the first through hole and a tapered second support portion that is inserted to a second through hole of the through holes in contact with an inner surface of the second through hole.

9. A display device comprising:
a display panel; and
a backlight disposed rearward of the display panel, the backlight emitting light to the display panel, the backlight including
a light source,
a light diffusion plate that is arranged opposite the light source, the light diffusion plate diffusing light from the light source, and
a sheet-like optical member that is disposed between the light diffusion plate and the light source, the optical member including a transmitting part that transmits the light emitted from the light source and a reflecting part that reflects the light emitted from the light source,
the optical member being supported by a support portion that is integrally provided to the light diffusion plate.

10. The display device according to claim 9, wherein
the support portion has a convex portion that is integrally provided to the light diffusion plate and protrudes toward the light source, and
the optical member has an engagement portion that engages the convex portion.

11. The display device according to claim 10, wherein
the convex portion has a shaft portion that extends toward the light source and a widening portion that is disposed at an end of the shaft portion and has a larger diameter than the shaft portion, and
the engagement portion of the optical member is engaged with the shaft portion and the widening portion of the convex portion while the optical member is disposed between a light diffusing surface of the light diffusion plate and the widening portion of the convex portion.

12. The display device according to claim 11, wherein
the support portion is configured such that the widening portion is formed by swaging the end of the shaft portion of the convex portion.

13. The display device according to claim 9, wherein
the light diffusion plate is provided with a spacer portion between the light diffusion plate and the optical member such that the light diffusion plate and the optical member are arranged substantially in parallel to each other and separated by a predetermined spacing.

14. The display device according to claim 13, wherein
the spacer portion is integrally provided to the support portion.

15. The lighting device according to claim 1, wherein
the transmitting part of the optical member includes a plurality of through holes arranged relative to the light source.

16. The lighting device according to claim 15, wherein
the reflecting part of the optical member includes a remainder portion of the optical member other than the through holes.

17. The lighting device according to claim 3, wherein
the shaft portion and the widening portion are coaxially arranged with respect to each other.

18. The lighting device according to claim 5, wherein
the support portion and the spacer portion are coaxially arranged with respect to each other.

19. The lighting device according to claim 5, wherein
the support portion and the spacer portion are arranged spaced apart from each other.

20. The lighting device according to claim 1, further comprising
a reflective sheet disposed on a light source side with respect to the optical member, the reflective sheet reflecting the light emitted from the light source,
the support portion contacting the reflective sheet.

* * * * *